(12) United States Patent
Torrecillas San Millan et al.

(10) Patent No.: US 8,828,281 B2
(45) Date of Patent: Sep. 9, 2014

(54) METHOD FOR OBTAINING CERAMIC COMPOUNDS AND RESULTING MATERIAL

(75) Inventors: Ramon Torrecillas San Millan, Oviedo (ES); Olga Garcia Moreno, Oviedo (ES); Adolfo Fernandez Valdes, Llanera (ES)

(73) Assignee: Consejo Superior de Investigaciones Cientificas (CSIC), Madrid (ES)

( * ) Notice: Subject to any disclaimer, the term of this patent is extended or adjusted under 35 U.S.C. 154(b) by 205 days.

(21) Appl. No.: 13/391,597

(22) PCT Filed: Aug. 17, 2010

(86) PCT No.: PCT/ES2010/070561
§ 371 (c)(1),
(2), (4) Date: Mar. 15, 2012

(87) PCT Pub. No.: WO2011/023842
PCT Pub. Date: Mar. 3, 2011

(65) Prior Publication Data
US 2012/0165180 A1 Jun. 28, 2012

(30) Foreign Application Priority Data

Aug. 27, 2009 (ES) .................................. 200930633

(51) Int. Cl.
| | | |
|---|---|---|
| H01B 1/02 | (2006.01) |
| C04B 35/52 | (2006.01) |
| C04B 35/56 | (2006.01) |
| C04B 35/50 | (2006.01) |
| C04B 35/51 | (2006.01) |
| C04B 35/19 | (2006.01) |
| C04B 35/626 | (2006.01) |
| C04B 35/645 | (2006.01) |
| B82Y 30/00 | (2011.01) |

(52) U.S. Cl.
CPC ......... *C04B 35/19* (2013.01); *C04B 2235/6027* (2013.01); *C04B 35/62695* (2013.01); *C04B 35/6263* (2013.01); *C04B 2235/604* (2013.01); *C04B 2235/96* (2013.01); *C04B 2235/3203* (2013.01); *C04B 2235/5436* (2013.01); *C04B 2235/9607* (2013.01); *C04B 2235/77* (2013.01); *C04B 2235/3472* (2013.01); *C04B 35/6261* (2013.01); *C04B 2235/6565* (2013.01); *C04B 2235/5454* (2013.01); *C04B 2235/666* (2013.01); *C04B 2235/9653* (2013.01); *C04B 35/645* (2013.01); *C04B 2235/3826* (2013.01); *C04B 2235/6567* (2013.01); *C04B 2235/6562* (2013.01); *B82Y 30/00* (2013.01)
USPC ........ 252/521.1; 252/521.3; 501/89; 501/152

(58) Field of Classification Search
USPC ........................ 501/153, 87, 88, 89, 127.152; 252/521.1, 521.3, 521.5
See application file for complete search history.

(56) References Cited

U.S. PATENT DOCUMENTS

| | | | |
|---|---|---|---|
| 4,403,017 A | 9/1983 | Bind | |
| 5,009,822 A * | 4/1991 | Sacks et al. | 264/641 |
| 5,071,797 A * | 12/1991 | Hida | 501/87 |
| 5,132,178 A * | 7/1992 | Chyung et al. | 428/372 |
| 6,066,585 A * | 5/2000 | Swartz | 501/128 |
| 6,953,538 B2 * | 10/2005 | Takahashi et al. | 252/518.1 |
| 7,112,549 B2 * | 9/2006 | Yoshitomi et al. | 501/128 |
| 7,557,054 B2 * | 7/2009 | Oda et al. | 501/90 |
| 2003/0146538 A1 * | 8/2003 | Sambrook et al. | 264/211 |
| 2007/0246156 A1 | 10/2007 | Kohlmann et al. | |
| 2011/0301016 A1 | 12/2011 | Torrecillas San Millan et al. | |

FOREIGN PATENT DOCUMENTS

| | | |
|---|---|---|
| EP | 0081061 | 6/1983 |
| EP | 1298104 | 4/2003 |
| ES | 2341081 | 6/2010 |
| JP | 2002220277 | 8/2002 |
| JP | 2007076949 | 3/2007 |

OTHER PUBLICATIONS

PCT International Search Report mailed Dec. 28, 2010, PCT Apln. No. PCT/ES2010/070561 filed Aug. 17, 2010 (2 pages).

Roy, Rustum, "Synthesizing New Materials to Specification", Solid State Ionics 32/33, (1989), 3-22.

* cited by examiner

*Primary Examiner* — Noah Wiese
(74) *Attorney, Agent, or Firm* — Blakeley, Sokoloff, Taylor & Zafman, LLP

(57) ABSTRACT

Starting from, as the initial composite, an LAS component in accordance with the composition $Li_xAl_ySi_zO_w$, where x varies between 0.8 and 1.2, y varies between 0.8 and 1.2, z varies between 0.8 and 2, and w varies between 4 and 6, the LAS component is subsequently mixed with SiC nanoparticles, to obtain a stable, homogeneous suspension. Thereafter, the resulting suspension is dried. Subsequently, the material obtained is shaped and, finally, the material obtained in the preceding step is sintered.

17 Claims, 2 Drawing Sheets

METHOD FOR OBTAINING CERAMIC COMPOUNDS AND RESULTING MATERIAL

CROSS-REFERENCE TO RELATED APPLICATIONS

The present patent application is a national phase application of International Application No. PCT/ES2010/070561, filed Aug. 17, 2010, which application claims priority to Spanish Application No. P 200930633, filed Aug. 27, 2009.

FIELD OF THE INVENTION

The present invention relates to ceramics with a thermal expansion coefficient very close to zero, which may be used in the manufacturing of components that require a high dimensional stability. Therefore, the technology disclosed in the invention pertains to the sector of new materials, whereas its application falls within the sectors of microelectronics, precision optics and the aeronautics and aerospace sectors.

The object of the invention relates to a process for obtaining ceramic composites with a thermal expansion coefficient (TEC) of less than $1 \times 10^{-6}$ $K^{-1}$ within the range (−150° C., +150° C.), and to the material obtainable by means of said process.

SUMMARY OF THE INVENTION

Materials with a low thermal expansion coefficient (TEC) have a wide range of applications in very different fields. These types of materials are required in many types of precision equipment and instrumentation equipment in high-technology systems, in the microelectronics industry and in precision optics. In sum, in all those applications where it is necessary to ensure the dimensional stability of a precision element with temperature changes, the TEC of the materials making up those elements will have to be reduced. The problem of the imbalance in thermal expansion in elements manufactured with different materials may also be resolved by designing composites with a required (and homogeneous) TEC. The design of these materials with a "customised" TEC may be approached by combining components with a positive and a negative expansion. This customised design of the TEC of composites may be performed for different temperatures, such that the final field of application of the components with a zero TEC will depend upon whether the rest of the characteristics required for the specific functionality of that application are also achieved. The family of lithium aluminosilicate (LAS) ceramics and glass ceramics is frequently used for this purpose in many fields of application, from glass ceramics for kitchens to mirrors for satellites. Some mineral phases of this family have a negative TEC, which makes it possible to use them in composites with a controlled, customised TEC. Frequently, materials with a negative TEC have a low fracture resistance, since their negative character is due to a strong anisotropy between the different crystallographic orientations, wherein the negative behaviour is usually found in one of them, and the positive behaviour is found in the other two. This anisotropy usually causes microcracks that result in low values for the mechanical properties of these materials. In any case, the utility of these expansion properties in the manufacturing of composites with a zero TEC has a broad potential in applications in engineering, photonics, electronics and specific structural applications (Roy, R. et al., Annual Review of Materials Science, 1989, 19, 59-81). In the LAS system, the phase with the negative expansion is β-eucryptite (LiAlSiO$_4$), due to the large negative expansion in the direction of one of its crystallographic axes. The spodumene (LiAlSi$_2$O$_6$) and petalite (LiAlSi$_4$O$_{10}$) phases have a TEC close to zero. The traditional method for manufacturing materials with an LAS composition is the processing of glass to produce glass ceramics. This method entails the shaping of glass in order to subsequently apply a heat treatment at lower temperatures, for the consequent precipitation of crystalline LAS phases and, thus, controlling the TEC thereof. Occasionally, this process produces heterogeneous materials and, naturally, since it is a glass, its mechanical properties (rigidity and resistance) are not sufficiently high for many industrial applications, as compared to other ceramics. This is the case of Zerodur® (commercialised by Schott), which is widely used in numerous applications, but has very low fracture resistance values. Therefore, if better mechanical properties are to be obtained, an alternative to glass ceramics is necessary. There are other ceramic materials with a TEC close to zero, such as cordierite, as described in U.S. Pat. No. 4,403,017, or Inver®. An alternative in the preparation of materials with a low TEC is the addition of a second phase having a positive thermal expansion coefficient to an LAS ceramic matrix with a negative TEC, as in the cases of U.S. Pat. No. 6,953,538, JP2007076949 or JP2002220277. This last option is very interesting, since the TEC value and the rest of the properties may be adjusted by the addition of the adequate proportions of second phases in the matrix. On the other hand, taking into consideration that the final properties of the material are a consequence of the combination of two or more components, the main difficulty of these composites lies in keeping the TEC value close to zero for a wide range of temperatures. Thus, in the aforementioned cases, the temperature ranges wherein a high dimensional stability is achieved are between 30° C.-50° C. Moreover, it is difficult to obtain dense materials with a simple manufacturing method that makes it possible to create complex shapes.

In the patent with application number P200803530, the applicant discloses a method for synthesising lithium aluminosilicates from kaolin, lithium carbonate and silica and alumina precursors in solution, whereby LAS ceramics with a controlled, customised TEC may be obtained by selecting different compositions within the Al$_2$O$_3$—Li$_2$O—SiO$_2$ phase diagram. The method proposed is simple and economical, and makes it possible to obtain ceramics with improved density and mechanical properties. The LAS powders with a negative TEC obtained using this process may be applied in the present invention to obtaining mixtures with a zero TEC.

DESCRIPTION OF THE INVENTION

The present invention solves the problem of obtaining, by means of a simple process, materials with a high dimensional stability within a temperature range that goes from cryogenic conditions to temperatures greater than room temperature (−150° C. to 150° C.). This broad temperature range wherein the TEC (thermal expansion coefficient) remains less than $1 \times 10^{-6}$ $K^{-1}$ multiplies the applications wherein the material may be used, from the manufacturing of glass ceramics, as one example of a technology for general everyday use, to mirrors for satellites, to mention one example of a more specialised technology that is not as well-known to the general public.

The alternative presented in this invention is obtaining ceramic materials with a low thermal expansion coefficient in a broad range of temperatures, which makes them adaptable to numerous applications.

The preparation is performed by means of a simple process for manufacturing nanocomposite powder, which is shaped and sintered in the solid state using different techniques, preventing the formation of glasses and, consequently, achieving improved mechanical properties. A β-eucryptite matrix and a second phase of nanometric silicon carbide (n-SiC) in the form of nanoparticles have been selected, in order to obtain a final material with good mechanical, electrical and thermal properties.

The present invention is based on a new process for obtaining composite ceramic materials based on lithium aluminosilicates (LAS) and nanometric silicon carbide (n-SiC). The final composition of the material may be adjusted as a function of the β-eucryptite content in the LAS component used, which determines the quantity of the second phase (SiC nanoparticles) that is required to obtain a final material with a TEC between $-1\times10^{-6}$ and $1\times10^{-6}$ $K^{-1}$. Thus, the TEC value of lithium aluminosilicate (LAS) is dependent on the composition thereof and, to the extent whereto it is more or less negative; this will determine the content of silicon carbide nanoparticles (n-SiC) necessary to obtain a final material with a zero thermal expansion coefficient.

The innovative process of the invention makes it possible to prepare materials with a very low TEC by means of pressureless sintering methods in a conventional furnace, thereby obtaining materials with a high relative density, which will affect the modulus of elasticity, the mechanical properties and the polishing capacity thereof.

Moreover, the invention is noteworthy because the sintering method provides a great versatility in the size and shape of the pieces obtained: on the one hand, it covers shapes other than the disks normally obtained in pressure methods and, on the other hand, the sizes may be greater than those obtained using said methods thus far.

The processing conditions of the composite material decisively affect the critical characteristics of the shaped material, such as the density or the porosity distribution thereof, which will largely determine whether it is possible to obtain a dense material by means of solid state sintering. During the processing of the nanocomposite powder, it is necessary to achieve a homogeneous mixture of the different components, so as to prevent the formation of agglomerates, which is particularly important in the case of nanometric powders.

Therefore, one aspect of the present invention is the process for obtaining a composite material pertaining to the LAS/SiC system the TEC whereof is less than $1\times10^{-6}$ $K^{-1}$ within the temperature range between $-150°$ C. and $150°$ C. The optimisation of the processing parameters, such as, for example, the grinding type and time, the stirring speed or the drying method, and the sintering conditions, the heating rate, the final temperature or the staying time, makes it possible to obtain a material with a density greater than 90% of the theoretical density and a fracture resistance and a Young's modulus greater than 130 MPa and 135 GPa, respectively. The adjustment of the processing conditions of the composite material makes it possible to improve its microstructure, thereby achieving a dramatic reduction in the porosity thereof.

A preferred aspect of the present invention, as discussed above, is the possibility of densifying the material by means of sintering in a conventional furnace without applying pressure, which makes it possible to obtain pieces with dimensions and shapes that would otherwise be unattainable.

One aspect of the present invention is the process for preparing ceramic materials, characterised in that it comprises the following steps:
a. the starting material is an LAS component in accordance with the composition $Li_xAl_ySi_zO_w$, where x varies between 0.8 and 1.2, y varies between 0.8 and 1.2, z varies between 0.8 and 2, and w varies between 4 and 6,
b. mixing of the LAS component defined in a) with SiC nanoparticles, to obtain a stable, homogeneous suspension,
c. drying of the resulting suspension,
d. shaping of the material obtained in c),
e. sintering of the material obtained in d).

A more preferred aspect of the present invention is the process for preparing composite ceramic materials wherein the LAS component is β-eucryptite solid solution.

A preferred aspect of the present invention is the process for preparing ceramic materials wherein the mixing of the LAS powder and the SiC nanoparticles of step b) is performed in an attrition mill, preferably operating at 100-400 rpm.

A preferred aspect of the present invention is the process for preparing ceramic materials wherein the β-eucryptite content of the resulting mixture is less than 75% by volume.

A preferred aspect of the present invention is the process for preparing ceramic materials wherein the drying, in step c), of the suspension resulting from mixing the two components is performed by spray-drying, to obtain nanocomposite granules.

A preferred aspect of the present invention is the process for preparing ceramic materials wherein the shaping of the material of step d) is performed by means of cold isostatic pressing at pressures ranging between 100 and 400 MPa.

A preferred aspect of the present invention is the process for preparing ceramic materials wherein shaping step d) is performed by the cast pouring of the suspension obtained in b).

A preferred aspect of the present invention is the process for preparing ceramic materials wherein the sintering of the shaped material of step e) is performed in a conventional furnace, in an inert atmosphere (preferably an argon atmosphere), at a temperature ranging between $1100°$ C. and $1600°$ C., for a period of time greater than 10 minutes.

A particular embodiment of the present invention is the process for preparing ceramic materials wherein the sintering of the shaped material of step e) is performed in a conventional furnace, in an argon atmosphere at $1390°$ C.

A preferred aspect of the present invention is the process for preparing ceramic materials wherein a heating slope of between 2 and $10°$ C./min is used in the sintering, maintaining the final temperature for a period of time ranging between 0.5 and 10 hours, and there is a subsequent cooling, preferably to $900°$ C., by means of a slope of between 2 and $10°$ C./min.

A preferred aspect of the present invention is the process for preparing ceramic materials wherein steps d) and e) comprise a hot-press step.

The hot-press technique is based on the simultaneous application of pressure and high temperature to accelerate the densification rate. In this technique, the heating takes place by using graphite resistances.

A preferred aspect of the present invention is the process for preparing ceramic materials wherein the hot-press step is performed at a temperature ranging between $900°$ C. and $1400°$ C., preferably $1150°$ C.

A preferred aspect of the present invention is the process for preparing ceramic materials wherein the hot-press step is performed by applying a uniaxial pressure of between 5 and 150 MPa, preferably 50 MPa, in a graphite mold.

A preferred aspect of the present invention is the process for preparing ceramic materials wherein the hot-press step is performed using a heating slope of between 2 and $50°$ C./min, preferably $5°$ C./min, maintaining the final temperature for a period of time ranging between 30 minutes and 10 hours.

A preferred aspect of the present invention is the process for preparing ceramic materials wherein the sintering is Spark Plasma Sintering (SPS).

The Spark Plasma Sintering (SPS) technique is also based on the simultaneous application of pressure and high temperature. Unlike in the hot-press technique, in this technique the heating takes place by the application of electric discharges through the graphite molds and also through the sample, which makes it possible to work with heating rates of the order of hundreds of degrees per minute.

A preferred aspect of the present invention is the process for preparing ceramic materials wherein the Spark Plasma Sintering (SPS) step is performed at a temperature ranging between 700° C. and 1400° C., preferably 1150° C.

A preferred aspect of the present invention is the process for preparing ceramic materials wherein the Spark Plasma Sintering (SPS) step is performed by applying a uniaxial pressure of between 5 and 100 MPa, preferably 40 MPa, in a graphite mold.

A preferred aspect of the present invention is the process for preparing ceramic materials wherein the Spark Plasma Sintering (SPS) step is performed using a heating slope of between 2 and 300° C./min, preferably 5° C./min, maintaining the final temperature for a period of time ranging between 1 and 30 minutes.

The material obtained in the present invention has a final density greater than 98% of the theoretical density and its thermal expansion coefficient is between $-1 \times 10^{-6}$ and $1 \times 10^{-6}$ K$^{-1}$ within the temperature range between $-150°$ C. to 150° C.

Another preferred aspect of the present invention is the use of the ceramic material prepared by means of any of the processes described above in the manufacturing of components that require a high dimensional stability, as in the case of the mirror structure in astronomical telescopes and X-ray telescopes in satellites, optical elements in comet probes, weather satellites and microlithographies, mirrors and frames in ring laser gyroscopes, distance indicators in resonance lasers, measuring bars and standards in high-precision measurement technologies, etc.

BRIEF DESCRIPTION OF THE DRAWINGS

In order to complement the description being made and contribute to a better understanding of the characteristics of the invention, in accordance with a preferred practical embodiment example thereof, a set of drawings is attached as an integral part of said description wherein the following has been represented for illustrative, non-limiting purposes.

DETAILED DESCRIPTION OF THE INVENTION

Composite LAS/SiC Material with a TEC of Less than $1 \times 10^{-6}$ K$^{-1}$ within the Range (−150, 150)° C.

EXAMPLE 1

The starting raw materials are:
LAS powder with the composition $LiAlSiO_4$ (composition A in FIG. 1), with a mean particle size of 1 μm and a density of 2.39 g/cm$^3$.
SiC powder from the manufacturer Hubei, with a mean particle size of less than 100 nm and a density of 3.20 g/cm$^3$.
Anhydrous ethanol (99.97% purity).

Figure 2:
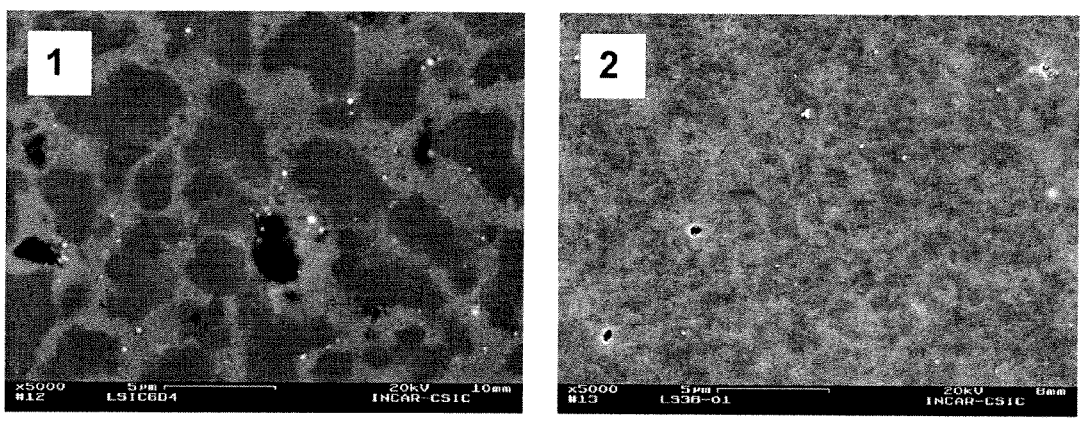
FIG. 2.—Influence of the processing conditions on the final microstructure of the LAS/SiC materials.

700 g of LAS were used, which were dispersed in 1400 g of ethanol. Subsequently, it is mixed with a suspension of 300 g of n-SiC in 1000 g of ethanol. The mixture is homogenised by means of mechanical stirring for 60 minutes and, thereafter, it is ground in an attrition mill operating at 300 rpm for 60 additional minutes. The suspension thus prepared is spray-dried, to obtain nanocomposite granules, whilst the ethanol from the process is recovered. The grinding step makes it possible to prepare a homogeneous powder of nanometric size, which improves the densification of the final material. In FIG. 2, the microstructures of two materials with the same composition and sintered with the same thermal cycle are compared; the only difference between them is that, in case 2, the material was subjected to the grinding process. The grain sizes of the LAS (dark grey colour) and the SiC agglomerates (light grey colour) are considerably reduced, whilst practically all the porosity (black colour) is eliminated.

The dry product was subjected to a shaping process by cold isostatic pressing at 200 MPa. A shaped material is obtained which is sintered in a conventional furnace in an Argon atmosphere at 1390° C., with a staying time of 120 minutes and a heating slope of 5° C./min.

Figure 3:
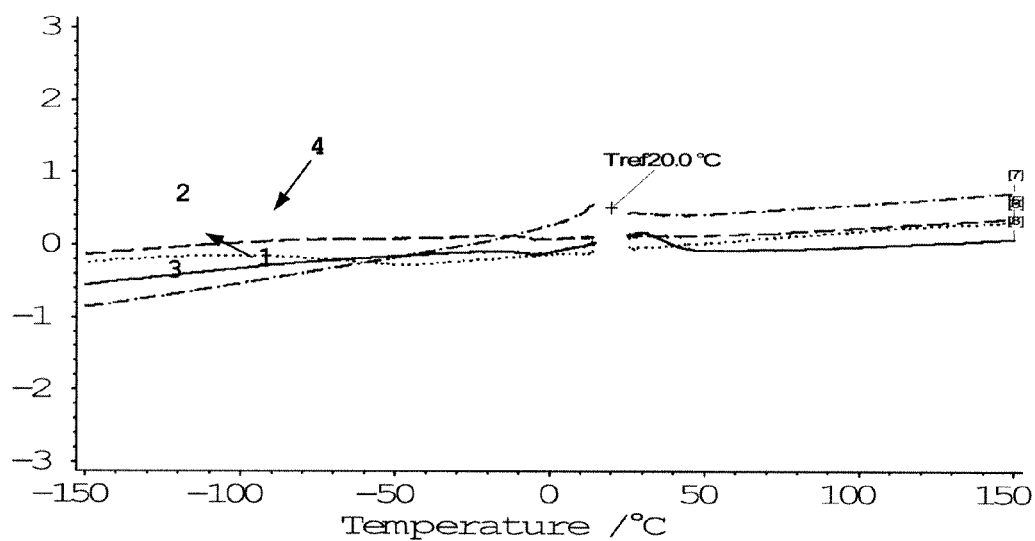
FIG. 3.—Thermal expansion coefficients (a curves) corresponding to the LAS/SiC materials obtained by means of sintering in a conventional furnace in an argon atmosphere, Hot-Press and SPS.

The resulting material was characterised in terms of its true density (helium pycnometry), apparent density (Archimedes method), Young's modulus (resonance frequency method in a Grindosonic equipment), fracture resistance (four-point bending method in an INSTRON 8562 equipment), and thermal expansion coefficient (dilatometer, NETSCH brand, model DIL402C). The corresponding values are shown in Table 1. The variation of the thermal expansion coefficient with temperature is represented in FIG. 3.

EXAMPLE 2

The starting raw materials are:
LAS powder with the composition $LiAlSiO_4$ (composition A in FIG. 1), with a mean particle size of 1 μm and a density of 2.39 g/cm$^3$.
SiC powder from the manufacturer Hubei, with a mean particle size of less than 100 nm and a density of 3.20 g/cm$^3$.
Anhydrous ethanol (99.97%).

700 g of LAS were used, which were dispersed in 1400 g of ethanol. Subsequently, it is mixed with a suspension of 300 g of n-SiC in 1000 g of ethanol. The mixture is homogenised by means of mechanical stirring for 60 minutes and, thereafter, it is ground in an attrition mill loaded with 9 kg of grinding balls, operating at 300 rpm for 60 additional minutes.

The suspension is spray-dried, to obtain nanocomposite granules, whilst the ethanol from the process is recovered.

The dry product thus obtained was subjected to a shaping and sintering process by means of Hot-Press. To this end, 50 grams of the material are introduced into a graphite mold 50 mm in diameter, and uniaxially pressed at 15 MPa. Subsequently, the sintering is performed, by applying a maximum pressure of 50 MPa, with a heating slope of 5° C./min, up to 1150° C., and a staying time of 60 minutes.

The resulting material was characterised in terms of its true density (helium pycnometry), apparent density (Archimedes method), Young's modulus (resonance frequency method in a Grindosonic equipment), fracture resistance (four-point bending method in an INSTRON 8562 equipment), and thermal expansion coefficient (dilatometer, NETSCH brand, model DIL402C). The corresponding values are shown in Table 1. The variation of the thermal expansion coefficient with temperature is represented in FIG. 3.

EXAMPLE 3

The starting raw materials are:
LAS powder with the composition LiAlSiO$_4$ (composition A in FIG. 1), with a mean particle size of 1 μm and a density of 2.39 g/cm$^3$.
SiC powder from the manufacturer Hubei, with a mean particle size of less than 100 nm and a density of 3.20 g/cm$^3$.
Anhydrous ethanol (99.97%).
700 g of LAS were used, which were dispersed in 1400 g of ethanol. Subsequently, it is mixed with a suspension of 300 g of n-SiC in 1000 g of ethanol. The mixture is homogenised by means of mechanical stirring for 60 minutes and, thereafter, it is ground in an attrition mill loaded with 9 kg of grinding balls, operating at 300 rpm for 60 additional minutes.

The suspension is spray-dried, to obtain nanocomposite granules, whilst the ethanol from the process is recovered.

The dry product thus obtained was subjected to a shaping and sintering process by means of Spark Plasma Sintering (SPS). To this end, 30 grams of the material are introduced into a graphite mold 40 mm in diameter and uniaxially pressed at 5 MPa. Subsequently, the sintering is performed, by applying a maximum pressure of 40 MPa, with a heating slope of 5° C./min, up to 1150° C., and a staying time of 2 minutes.

The resulting material was characterised in terms of its true density (helium pycnometry), apparent density (Archimedes method), Young's modulus (resonance frequency method in a Grindosonic equipment), fracture resistance (four-point bending method in an INSTRON 8562 equipment), and thermal expansion coefficient (dilatometer, NETSCH brand, model DIL402C). The corresponding values are shown in Table 1. The variation of the thermal expansion coefficient with temperature is represented in FIG. 3.

EXAMPLE 4

The starting raw materials are:
LAS powder with the composition LiAlSiO$_4$ (composition A in FIG. 1), with a mean particle size of 1 μm and a density of 2.39 g/cm$^3$.
SiC powder from the manufacturer Hubei, with a mean particle size of less than 100 nm and a density of 3.20 g/cm$^3$.
Distilled water.
700 g of LAS were used, which were dispersed in 1400 g of water. Subsequently, it is mixed with a suspension of 300 g of n-SiC in 1000 g of water. The mixture is homogenised by means of mechanical stirring for 60 minutes and, thereafter, it is ground in an attrition mill operating at 300 rpm for 60 additional minutes. Subsequently, whilst keeping the suspension under stirring, it is heated in order to evaporate the solvent, until a suspension is obtained with a solid content greater than 55% by weight. 0.25% by weight of ammonium polyacrylate and 0.5% by weight of triethylene glycol are added. After keeping the stirring for one hour, it is cast-poured on a porous alumina mold. A shaped material is obtained with the shape of the mold, which is sintered in a conventional furnace in an Argon atmosphere at 1390° C., with a staying time of 120 minutes and a heating slope of 5° C./min.

The resulting material was characterised in terms of its true density (helium pycnometry), apparent density (Archimedes method), Young's modulus (resonance frequency method in a Grindosonic equipment), fracture resistance (four-point bending method in an INSTRON 8562 equipment), and thermal expansion coefficient (dilatometer, NETSCH brand, model DIL402C). The corresponding values are shown in Table 1. The variation of the thermal expansion coefficient with temperature is represented in FIG. 3.

Figure 1:
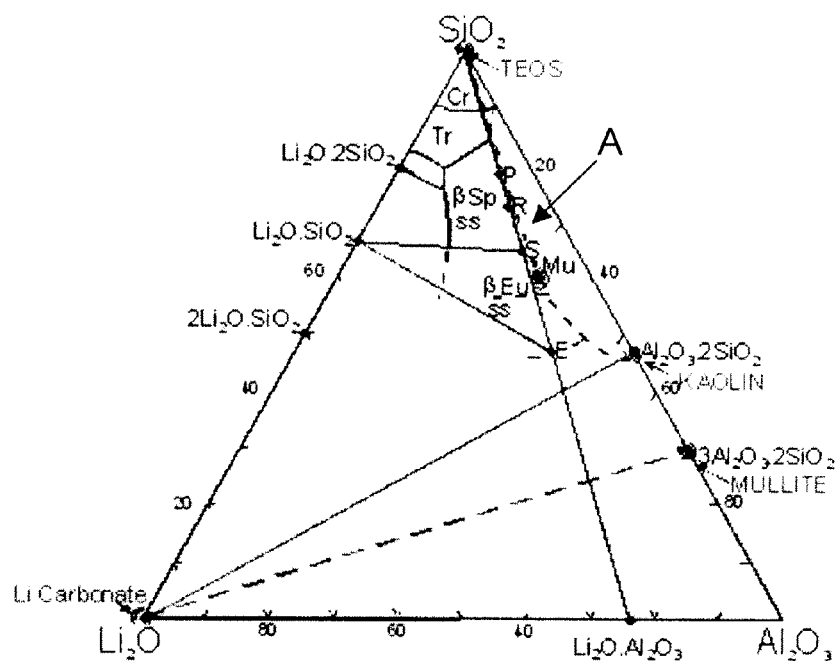
FIG. 1.—Phase diagram of the $Li_2O$—$Al_2O_3$—$SiO_2$ system, which shows the composition used in the embodiment examples.

Table 2 shows the abbreviations of the composites of the SiO$_2$—Li$_2$O—Al$_2$O$_3$ phase diagram of FIG. 1.

TABLE 1

| Property | Ex. 1 | Ex. 2 | Ex. 3 | Ex. 4 |
|---|---|---|---|---|
| % Theoretical density 100 × (d$_{apparent}$/d$_{true}$) | 98.5 | 97 | 100 | 99.2 |
| Young's modulus (GPa) | 130 | 150 | 135 | 136 |
| Fracture resistance (MPa) | 115 | 120 | 113 | 125 |
| TEC (×10$^{-6}$ K$^{-1}$) (−150, 150) ° C. | −0.28 | −0.79 | −0.18 | 0.12 |

TABLE 2

| Abbreviation | Composite |
|---|---|
| Cr | Cristobalite |
| Tr | Tridymite |
| Mu | Mullite |
| B Sp ss | Spodumene solid solution |
| B Eu ss | Eucryptite solid solution |
| P | Petalite |
| R | Li orthodase |
| S | Spodumene |
| E | Eucryptite |

The invention claimed is:

1. Process for obtaining ceramic composites consisting of the following steps:
   a. starting from a β-eucryptite phase solid solution of an LAS component in accordance with the composition Li$_x$Al$_y$Si$_z$O$_w$, where x varies between 0.8 and 1.2, y varies between 0.8 and 1.2, z varies between 0.8 and 2, and w varies between 4 and 6,
   b. mixing the β-eucryptite phase solid solution of the LAS component obtained in a) with SiC in an attrition mill operating at over 100 rpm, wherein SiC is in the form of nanoparticles with a mean particle size less than 100 nm, for obtaining a stable, homogeneous suspension with a content in β-eucryptite less than 75% by volume,
   c. drying of the resulting suspension,
   d. shaping of the material obtained in c),
   e. sintering of the material obtained in d).

2. The process of claim 1, wherein the drying of step c) is performed by spray-drying, for obtaining nanocomposite granules.

3. The process of claim 1, wherein the shaping of step d) is performed by means of cold isostatic pressing at pressures ranging between 100 and 400 MPa.

4. The process of claim 1, wherein step d) is performed by means of cast pouring of the suspension obtained in b).

5. The process of claim 1, wherein the sintering of step e) is performed in an inert atmosphere at a temperature ranging between 1100° C. and 1600° C.

6. The process of claim 5, wherein step e) is performed in an argon atmosphere.

7. The process of claim 5, wherein the duration of sintering step e) is greater than 10 minutes.

8. The process of claim 5, wherein a heating slope of between 2 and 10° C./min is used, maintaining the final temperature for a period of time ranging between 30 minutes and 10 hours, and there is a subsequent cooling to 900° C., with a slope of between 2 and 10° C./min.

9. The process of claim 1, wherein steps d) and e) comprise a hot-press step.

10. The process of claim 9, wherein the hot-press process is performed to a final temperature ranging between 900° C. and 1400° C.

11. The process of claim 9, wherein, in the hot-press process, a uniaxial pressure of between 5 and 150 MPa is applied in a graphite mold.

12. The process of claim 9, wherein, in the hot-press process, a heating slope of between 2 and 50° C./min is used, maintaining the final temperature for a period of time ranging between 30 minutes and 10 hours.

13. The process of claim 1, wherein the sintering is spark plasma sintering (SPS).

14. The process of claim 13, wherein the spark plasma sintering process is performed to a final temperature ranging between 700° C. and 1400° C.

15. The process of claim 13, wherein, in the spark plasma sintering process, a uniaxial pressure of between 5 and 100 MPa is applied in a graphite mold.

16. The process of claim 13, wherein, in the spark plasma sintering process, a heating slope of between 2 and 300 ° C./min is used, preferably 5° C./min, maintaining the final temperature for a period of time ranging between 1 and 30 minutes.

17. A ceramic material obtainable according to the process described in claim 1, wherein the ceramic material shows a thermal expansion coefficient ranging between $[-1\times10^{-6}$ and $+1\times10^{-6}]$ $K^{-1}$ within the temperature range $[-150$ to $+150]°$ C., where the final density thereof is greater than 98% of the theoretical density.

\* \* \* \* \*